(12) United States Patent
Hurwitz et al.

(10) Patent No.: US 12,260,598 B2
(45) Date of Patent: Mar. 25, 2025

(54) LEARNING-BASED IMAGE COMPRESSION SETTING

(71) Applicant: Google LLC, Mountain View, CA (US)

(72) Inventors: Jonathan D. Hurwitz, San Jose, CA (US); Punyabrata Ray, San Jose, CA (US)

(73) Assignee: Google LLC, Mountain View, CA (US)

( * ) Notice: Subject to any disclaimer, the term of this patent is extended or adjusted under 35 U.S.C. 154(b) by 300 days.

(21) Appl. No.: 17/420,875

(22) PCT Filed: Jun. 13, 2020

(86) PCT No.: PCT/US2020/037646
§ 371 (c)(1),
(2) Date: Jul. 6, 2021

(87) PCT Pub. No.: WO2021/251988
PCT Pub. Date: Dec. 16, 2021

(65) Prior Publication Data
US 2022/0053195 A1 Feb. 17, 2022

(51) Int. Cl.
*G06T 9/00* (2006.01)
*G06F 18/214* (2023.01)
(Continued)

(52) U.S. Cl.
CPC ............ *G06T 9/002* (2013.01); *G06F 18/214* (2023.01); *G06N 3/04* (2013.01); *G06V 10/40* (2022.01);
(Continued)

(58) Field of Classification Search
CPC ...... G06F 18/214; G06F 18/21; G06F 16/583; G06N 3/04; G06N 20/00; G06N 3/045;
(Continued)

(56) References Cited

U.S. PATENT DOCUMENTS 9,536,324 B1 * 1/2017 Fram ................ H04N 19/895
2015/0098646 A1 4/2015 Paris et al.
(Continued)

FOREIGN PATENT DOCUMENTS

CN 105513100 A * 4/2016 ....... G06F 17/30247
JP 2001-069508 3/2001
(Continued)

OTHER PUBLICATIONS

Han, S., & Vasconcelos, N. (Oct. 2006). Image compression using object-based regions of interest. In 2006 International Conference on Image Processing (pp. 3097-3100). IEEE. (Year: 2006).*
(Continued)

*Primary Examiner* — Andrae S Allison
*Assistant Examiner* — Emmanuel Silva-Avina
(74) *Attorney, Agent, or Firm* — IP Spring

(57) ABSTRACT

Embodiments described herein relate to methods, devices, and computer-readable media to determine a compression setting. An input image may be obtained where the input image is associated with a user account. One or more features of the input image may be determined using a feature-detection machine-learning model. A compression setting for the input image may be determined using a user-specific machine-learning model personalized to the user account based on the one or more features in the input image. The input image may be compressed based on the compression setting.

20 Claims, 5 Drawing Sheets

(51) Int. Cl.
  *G06N 3/04* (2023.01)
  *G06V 10/40* (2022.01)
  *G06V 10/70* (2022.01)
  *G06V 10/778* (2022.01)
  *H04N 19/136* (2014.01)
  *H04N 19/162* (2014.01)

(52) U.S. Cl.
  CPC .......... *G06V 10/70* (2022.01); *G06V 10/7784* (2022.01); *G06V 10/7788* (2022.01); *H04N 19/136* (2014.11); *H04N 19/162* (2014.11)

(58) Field of Classification Search
  CPC ........ G06N 3/08; G06T 9/002; H04N 19/136; H04N 19/162; G06V 10/40; G06V 10/70; G06V 10/7784; G06V 10/7788; G06V 10/774; G06V 10/766
  USPC .......................................................... 382/157
  See application file for complete search history.

(56) References Cited

U.S. PATENT DOCUMENTS

| | | | |
|---|---|---|---|
| 2018/0336226 A1 | 11/2018 | Anorga et al. | |
| 2020/0193238 A1* | 6/2020 | Ghuge | G06F 18/24 |
| 2021/0099731 A1* | 4/2021 | Zhai | H04N 19/90 |

FOREIGN PATENT DOCUMENTS

| | | |
|---|---|---|
| JP | 2006/332882 | 12/2006 |
| JP | 2008-099012 | 4/2008 |
| JP | 2008099012 A * | 4/2008 |
| JP | 2009-049979 | 3/2009 |
| JP | 2015-516734 | 6/2015 |
| JP | 2020-518191 | 6/2020 |
| KR | 101704775 | 2/2017 |
| KR | 101704775 B1 * | 2/2017 |
| WO | 2019-012363 | 1/2019 |
| WO | 2019/093268 | 5/2019 |

OTHER PUBLICATIONS

EPO, International Search Report for International Patent Application No. PCT/US2020/037646, Mar. 11, 2021, 4 pages.
EPO, Written Opinion for International Patent Application No. PCT/US2020/037646, Mar. 11, 2021, 6 pages.
EPO, Communication Pursuant to Article 94(3) EPC for European Patent Application No. 20736512.3, Jul. 14, 2023, 7 pages.
Shi, et al., "Photo Album Compression for Cloud Storage Using Local Features", IEEE Journal on Emerging and Selected Topics in Circuits and Systems, vol. 4, No. 1, Mar. 12, 2014, 12 pages.
IPO, First Examination Report for Indian Patent Application No. 202247066729, Feb. 6, 2023, 7 pages.
EPO, Communication Pursuant to Article 94(3) EPC for European Patent Application No. 20736512.3, Jan. 26, 2024, 6 pages.
JPO, Notice of Reasons for Refusal (with English translation) for Japanese Patent Application No. 2022-574798, Mar. 5, 2024, 17 pages.
Marzuki, et al., "Perceptual Adaptive Quantization Parameter Selection Using Deep Convolutional Features for HEVC Encoder", IEEE Access 8, 2020, pp. 37052-37065.
EPO, Communication Pursuant to Article 94(3) EPC for European Patent Application No. 20736512.3, Jul. 11, 2024, 6 pages.
JPO, Notice of Reasons for Refusal (with English translation) for Japanese Patent Application No. 2022-574798, Aug. 20, 2024, 8 pages.
CNIPA, First Office Action (with English translation) for Chinese Patent Application No. 202080009025.1, Oct. 30, 2024, 19 pages.
Duanmu, Fanyi, "Fast Mode and Partition Decision Using Machine Learning for Intra-Frame Coding in HEVC Screen Content Coding Extension," IEEE Journal on Emerging and Selected Topics in Circuits and Systems, vol. 6, No. 4, Dec. 2016, pp. 517-531.
Pfaff, J. et al., "Neural network based intra prediction for video coding," Applications of Digital Image Processing XLI, vol. 10752, 2018, 7 pages.

* cited by examiner

LEARNING-BASED IMAGE COMPRESSION SETTING

CROSS-REFERENCE TO RELATED APPLICATIONS

The present application is a U.S. National Phase application of International Patent Application No. PCT/US2020/037646, filed Jun. 13, 2020 and titled LEARNING-BASED IMAGE COMPRESSION SETTING, the entire contents of which are incorporated herein by reference in their entirety.

BACKGROUND

With the increasing popularity of smartphones and other portable cameras, users are capturing an increasing number of images. However, on-device as well as cloud or server storage is a finite resource. Image compression is an effective way to reduce the amount of storage space required to store an image. However, lossy compression can cause the compressed image to be of perceivably lower quality, resulting in a suboptimal user experience.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments described herein relate to methods, devices, and computer-readable media to generate a compression setting. The method may include obtaining an input image, the input image associated with a user account, determining, using a feature-detection machine-learning model, one or more features of the input image, determining, using a user-specific machine-learning model personalized to the user account, a compression setting for the input image based on the one or more features in the input image, and compressing the input image based on the compression setting.

In some embodiments, the feature-detection machine-learning model is generated by: obtaining a training set of digital images and corresponding features and training the feature-detection machine-learning model based on the training set and the corresponding features, wherein after training, the feature-detection machine-learning model is capable of identifying image features in the input image provided to the feature-detection machine-learning model. In some embodiments, the feature-detection machine-learning model includes a convolutional neural network (CNN) with a plurality of network layers, wherein each network layer extracts the one or more image features at different levels of abstraction. In some embodiments, the user-specific machine-learning model is generated by: obtaining a training set of user-specific features associated with a user, the user-specific features indicative of user action with reference to one or more prior images and training the user-specific machine-learning model based on the user-specific features and the one or more prior images, wherein after training, the user-specific machine-learning model determines a rating for the input image provided to the user-specific machine-learning model. In some embodiments, wherein the respective image features of the one or more prior images are obtained by applying the feature-detection machine-learning model to the one or more prior images.

In some embodiments, the method can further include providing a first user interface to a user associated with the user account with two or more versions of a sample image, each compressed with a different compression setting, obtaining user input from the user that identifies a particular version of the sample image, and selecting a compression setting associated with the particular version of the sample image as a baseline compression setting for the user account. In some embodiments, determining the compression setting comprises: determining, by the user-specific machine-learning model a rating for the input image and mapping the rating to the compression setting, wherein the mapping is based on the baseline compression setting.

In some embodiments, the method can further include determining that the rating for the input image meets an importance threshold and in response to determination that the rating meets the importance threshold, performing one or more of: providing a suggestion that the user share the input image, prioritizing backup of the input image over backup of other images associated with the user account that do not meet the importance threshold, or providing a second user interface that includes instructions for capture of a subsequent image, if a scene depicted in the subsequent image has at least one of the one or more features of the input image.

Some embodiments can include a computing device comprising a processor and a memory, with instructions stored thereon that, when executed by the processor cause the processor to perform operations comprising: obtaining an input image, the input image associated with a user account, determining, using a feature-detection machine-learning model, one or more features of the input image, determining, using a user-specific machine-learning model personalized to the user account, a compression setting for the input image based on the one or more features in the input image, and compressing the input image based on the compression setting.

In some embodiments, the feature-detection machine-learning model is generated by: obtaining a training set of digital images and corresponding features and training the feature-detection machine-learning model based on the training set and the corresponding features, wherein after training, the feature-detection machine-learning model is capable of identifying image features in the input image provided to the feature-detection machine-learning model. In some embodiments, the user-specific machine-learning model is generated by: obtaining a training set of user-specific features associated with a user, the user-specific features indicative of user action with reference to one or more prior images and training the user-specific machine-learning model based on the user-specific features and the one or more prior images, wherein after training, the user-specific machine-learning model determines a rating for the input image provided to the user-specific machine-learning model.

In some embodiments, wherein the memory has further instructions stored thereon that, when executed by the processor cause the processor to perform further operations comprising: providing a first user interface to a user associated with the user account with two or more versions of a sample image, each compressed with a different compression setting, obtaining user input from the user that identifies a particular version of the sample image, and selecting a compression setting associated with the particular version of the sample image as a baseline compression setting for the user account. In some embodiments, determining the compression setting comprises: determining, by the user-specific machine-learning model a rating for the input image and mapping the rating to the compression setting, wherein the mapping is based on the baseline compression setting.

Some embodiments can include a non-transitory computer-readable medium with instructions stored thereon that, when executed by one or more computers, cause the one or more computers to perform operations, the operations comprising: obtaining an input image, the input image associated with a user account, determining, using a feature-detection machine-learning model, one or more features of the input image, determining, using a user-specific machine-learning model personalized to the user account, a compression setting for the input image based on the one or more features in the input image, and compressing the input image based on the compression setting.

In some embodiments, the feature-detection machine-learning model is generated by: obtaining a training set of digital images and corresponding features and training the feature-detection machine-learning model based on the training set and the corresponding features, wherein after training, the feature-detection machine-learning model is capable of identifying image features in the input image provided to the feature-detection machine-learning model. In some embodiments, the user-specific machine-learning model is generated by: obtaining a training set of user-specific features associated with a user, the user-specific features indicative of user action with reference to one or more prior images and training the user-specific machine-learning model based on the user-specific features and the one or more prior images, wherein after training, the user-specific machine-learning model determines a rating for the input image provided to the user-specific machine-learning model. In some embodiments, the training set further includes respective image features of the one or more prior images.

In some embodiments, the operations further comprise: providing a first user interface to a user associated with the user account with two or more versions of a sample image, each compressed with a different compression setting, obtaining user input from the user that identifies a particular version of the sample image, and selecting a compression setting associated with the particular version of the sample image as a baseline compression setting for the user account. In some embodiments, determining the compression setting comprises: determining, by the user-specific machine-learning model a rating for the input image and mapping the rating to the compression setting, wherein the mapping is based on the baseline compression setting.

DETAILED DESCRIPTION

Figure 1:
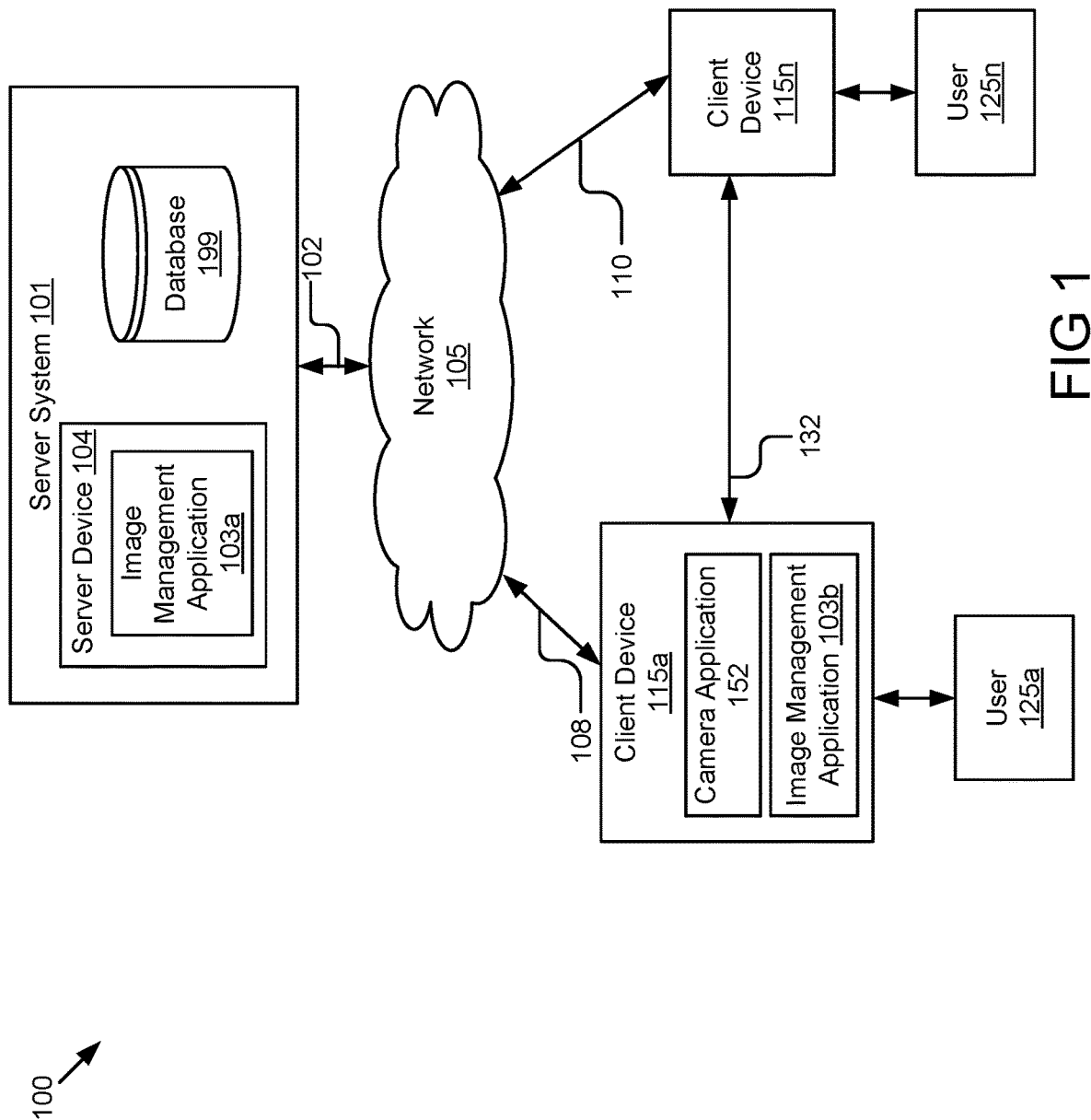
FIG. 1 is a block diagram of an example network environment which may be used for one or more embodiments described herein.

Users capture images using a camera, such as via a smartphone or other devices. For example, the image may include a static image, a cinemagraph/motion image, or an image frame from a video. The user may store the images on a client device or a server, for example, a server that provides image hosting services. An application may be provided via a client device of the user and/or a server that enables the user to manage the images, such as by viewing and/or editing the images; generating image-based creations such as slideshows, collages, etc.; sharing the images; posting the images to a social network or chat application where other users provide indications of approval for the images, such as by liking the images or coming on the images; etc.

Storage space on the client device or at the server is finite. One way to obtain additional storage space without having to delete images is to use image compression to reduce the file size of the images. However, lossy compression can cause the image quality to degrade, resulting in a suboptimal user experience when all images associated with a user undergo image compression.

When a user account has a large number of images, it is likely that a subset of those images are images that the user is particularly fond of. For example, some users may only feel strongly about the quality of their landscape photos because they enjoy printing them out. Others may feel strongly about high-resolution portraits of people, since they enjoy sharing these portraits with family or may run a photography business. The image quality for receipts, screenshots, or other functional images (e.g., meme images, photos of business cards, newspaper articles, etc.) may be not so important. Thus, user perception of loss from image compression can depend on the type of image and the user account associated with the image. Thus, it is advantageous to identify which images are likely to be important to a user. In some embodiments, an image management application generates and utilizes a feature-detection machine-learning model that identifies features in a first image. The image management application may also generate a user-specific machine-learning model that is personalized to the user account. The image management application may use the user-specific machine-learning model to determine a compression setting for the first image. The image management application may compress the first image based on the compression setting, thereby freeing up storage space since the resultant compressed image is of a lower filesize than the original image.

The figures use like reference numerals to identify like elements. A letter after a reference numeral, such as "103a," indicates that the text refers specifically to the element having that particular reference numeral. A reference numeral in the text without a following letter, such as "103," refers to any or all of the elements in the figures bearing that reference numeral (e.g. "103" in the text refers to reference numerals "103a" and/or "103b" in the figures).

Example Network Environment 100

FIG. 1 illustrates a block diagram of an example network environment 100, which may be used in some embodiments described herein. In some embodiments, network environment 100 includes one or more server systems, e.g., server system 101 in the example of FIG. 1. Server system 101 can communicate with a network 105, for example. Server system 101 can include a server device 104 and a database 199 or other storage device. Database 199 may store one or more images and/or videos and metadata associated with the one or more images and/or videos. In some embodiments, server device 104 may provide an image management application 103a. Image management application 103a may access the images stored in database 199.

Network environment 100 also can include one or more client devices, e.g., client devices 115a, 115n, which may communicate with each other and/or with server system 101 via network 105. Network 105 can be any type of communication network, including one or more of the Internet, local area networks (LAN), wireless networks, switch or hub connections, etc. In some embodiments, network 105 can include peer-to-peer communication between devices, e.g., using peer-to-peer wireless protocols (e.g., Bluetooth®, Wi-Fi Direct, Ultrawideband, etc.), etc. One example of peer-to-peer communications between two client devices 115a and 115b is shown by arrow 132.

For ease of illustration, FIG. 1 shows one block for server system 101, server device 104, and database 199, and shows two blocks for client devices 115a and 115n. Server blocks 101, 104, and 199 may represent multiple systems, server devices, and network databases, and the blocks can be provided in different configurations than shown. For example, server system 101 can represent multiple server systems that can communicate with other server systems via the network 105. In some embodiments, server system 101 can include cloud hosting servers, for example. In some examples, database 199 and/or other storage devices can be provided in server system block(s) that are separate from server device 104 and can communicate with server device 104 and other server systems via network 105.

There may be any number of client devices 115. Each client device can be any type of electronic device, e.g., desktop computer, laptop computer, portable or mobile device, cell phone, smartphone, tablet computer, camera, smart display, television, TV set top box or entertainment device, wearable devices (e.g., display glasses or goggles, wristwatch, headset, armband, jewelry, etc.), personal digital assistant (PDA), media player, game device, etc. Some client devices may also include a local database similar to database 199 or other storage. In some embodiments, network environment 100 may not have all of the components shown and/or may have other elements including other types of elements instead of, or in addition to, those described herein.

In various embodiments, users 125 may communicate with server system 101 and/or each other using respective client devices 115a, 115n. In some examples, users 125 may interact with each other via applications running on respective client devices and/or server system 101 via a network service, e.g., a social network service, an image hosting service, or other type of network service, implemented on server system 101. For example, respective client devices 115a, 115n may communicate data to and from one or more server systems, e.g., server system 101.

In some embodiments, the server system 101 may provide appropriate data to the client devices 115a, 115n such that each client device 115 can receive communicated content or shared content uploaded to the server system 101 and/or network service. In some examples, users 125 can interact via audio or video conferencing, audio, video, or text chat, or other communication modes or applications. A network service implemented by server system 101 can include a system allowing users 125 to perform a variety of communications, form links and associations, upload and post shared content such as images, text, video, audio, and other types of content, and/or perform other functions. For example, a client device 115 can display received data such as content posts sent or streamed to the client device 115 and originating from a different client device 115 via a server and/or network service (or from the different client device 115 directly), or originating from a server system 101 and/or network service. In some embodiments, client devices 115a, 115n can communicate directly with each other, e.g., using peer-to-peer communications between client devices 115, 115n as described above. In some embodiments, a "user" can include one or more programs or virtual entities, as well as persons that interface with the system or network 105.

In some embodiments, any of the client devices 115a, 115n can provide one or more applications. For example, as shown in FIG. 1, client device 115a may provide a camera application 152 and an image management application 103b. Client devices 115n may also provide similar applications. The camera application 152 may provide a user 125a of a respective client device 115a with the ability to capture images using a camera of their respective client device 115a. For example, camera application 152 may be a software application that executes on client device 115a.

In some embodiments, camera application 152 may provide a user interface. For example, the user interface may enable a user of client device 115a to select an image capture mode, e.g., a static image (or photo) mode, a burst mode (e.g., capture of a successive number of images in a short time period), a motion image mode, a video mode, a high dynamic range (HDR) mode, resolution settings, etc. For example, the video mode may correspond to capture of a video including a plurality of frames and may be of any length. Further, the video mode may support different frame rates, e.g., 25 frames per second (fps), 30 fps, 50 fps, 60 fps, etc. One or more parameters of image capture may be varied during capture of the image or video. For example, a user may use the client device 115a to zoom in to the scene or zoom out, while capturing a video.

Figure 3:
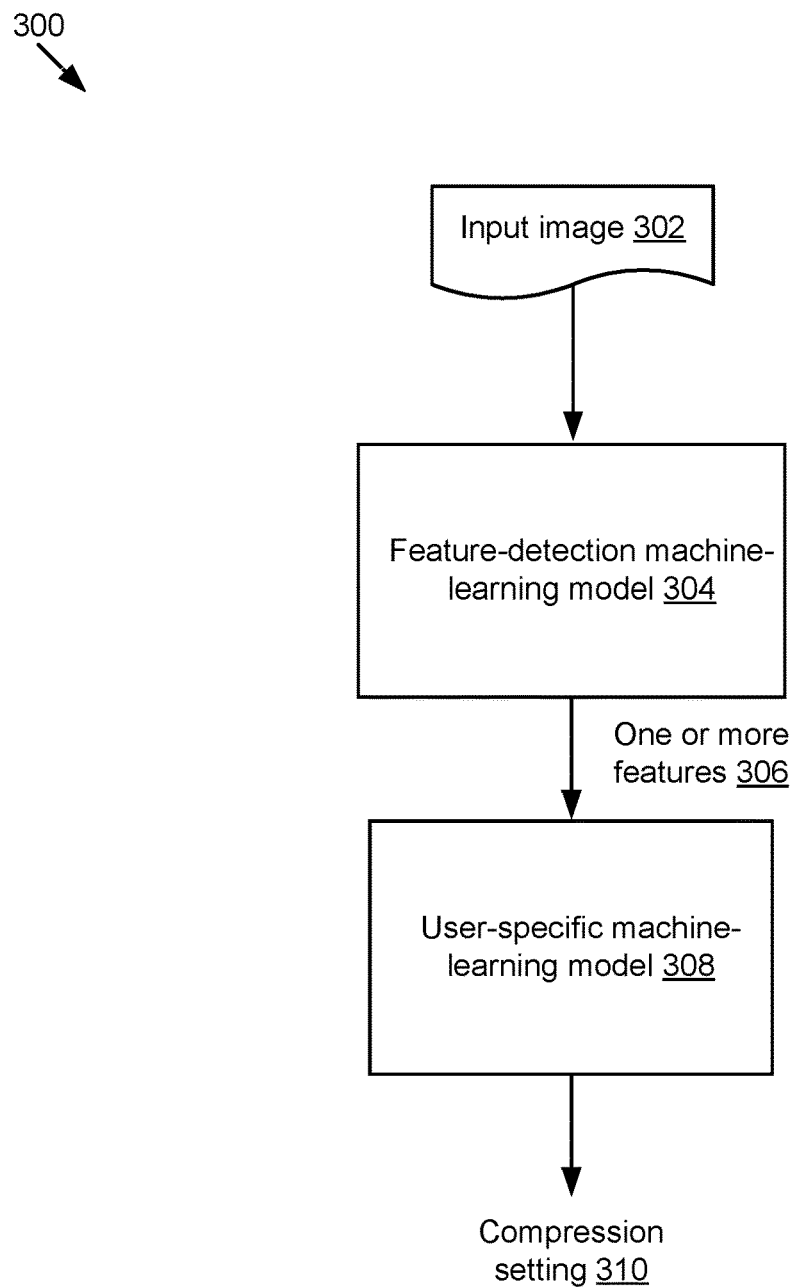
FIG. 3 is a flow diagram illustrating an example method to use a feature-detection machine-learning model to identify one or more features in an input image and to use a user-specific machine-learning model to determine a compression setting from the one or more features of the image, according to some embodiments.

In some embodiments, camera application 152 may implement (e.g., partially or wholly) the methods described herein with reference to FIGS. 3 and 4A-4B. In some embodiments, image management application 103a and/or image management application 103b may implement (e.g., partially or wholly) the methods described herein with reference to FIGS. 3 and 4A-4B.

Camera application 152 and image management application 103b may be implemented using hardware and/or software of the client device 115a. In different embodiments, the image management application 103b may be a stand-alone application, e.g., executed on any of client devices 115a, 115n, or may work in conjunction with image management application 103a provided on server system 101.

With user permission, image management application 103 may perform one or more automatic functions such as storing (e.g., backing up) the image or video (e.g., to database 199 of server system 101), enhancing the image or video, stabilizing the image or video, recognizing one or more features in the image, e.g., a face, a body, a type of object, a type of movement, compressing the image, etc. In some examples, image or video stabilization may be performed based on input from an accelerometer, a gyroscope, or other sensors of client device 115a, and/or based on comparison of a plurality of frames of a motion image or video.

Image management application 103 may also provide image management functions such as displaying images and/or videos in a user interface (e.g., in a one-up view that includes a single image, in a grid view that includes multiple images, etc.), editing images or videos (e.g., adjusting image settings, applying filters, changing image focus, removing one or more frames of a motion image or video), sharing images with other users (e.g., of client devices 115a, 115n), archiving an image (e.g., storing the image such that it does not appear in a primary user interface), generating image-based creations (e.g., collages, photo books, motion-based artifacts such as animations, stories, video loops, etc.), etc. In some embodiments, to generate an image-based creation, image management application 103 may utilize one or more labels associated with an image or video.

In some embodiments, image management application 103 may determine one or more features of an image and determine a compression setting for the image based on the one or more features in the image. In some embodiments, the image management application 103 may store the compression setting associated with an image or video and the compressed image or video in database 199 and/or a local database on a client device 115 (not shown). In some embodiments, the image management application 103 immediately deletes the original image, saves the original image and lets the user confirm deletion, or saves the original image for a certain number of days and then deletes the original image.

A user interface on a client device 115 can enable display of user content and other content, including images, video, data, and other content as well as communications, privacy settings, notifications, and other data. Such a user interface can be displayed using software on the client device 115, software on the server device 104, and/or a combination of client software and server software executing on server device 104, e.g., application software or client software in communication with server system 101. The user interface can be displayed by a display device of a client device 115 or server device 104, e.g., a touchscreen or other display screen, projector, etc. In some embodiments, application programs running on a server system 101 can communicate with a client device 115 to receive user input at the client device 115 and to output data such as visual data, audio data, etc. at the client device 115.

In some embodiments, any of server system 101 and/or one or more client devices 115a, 115n can provide a communication application program. The communication program may allow a system (e.g., client device 115 or server system 101) to provide options for communicating with other devices. The communication program can provide one or more associated user interfaces that are displayed on a display device associated with the server system 101 or client device 115. The user interface may provide various options to a user to select communication modes, users or devices with which to communicate, etc. In some examples, the communication program can provide an option to send or broadcast a content post, e.g., to a broadcast area, and/or can output a notification indicating that a content post has been received by the device and, e.g., the device is in the defined broadcast area for the post. The communication program can display or otherwise output transmitted content posts and received content posts, e.g., in any of a variety of formats. Content posts can include, for example, images, shared with other users.

Other embodiments of features described herein can use any type of system and/or service. For example, other networked services (e.g., connected to the Internet) can be used instead of or in addition to a social networking service. Any type of electronic device can make use of features described herein. Some embodiments can provide one or more features described herein on one or more client or server devices disconnected from or intermittently connected to computer networks. In some examples, a client device 115 including or connected to a display device can display data (e.g., content) stored on storage devices local to the client device 115, e.g., received previously over communication networks.

Example Device 200

Figure 2:
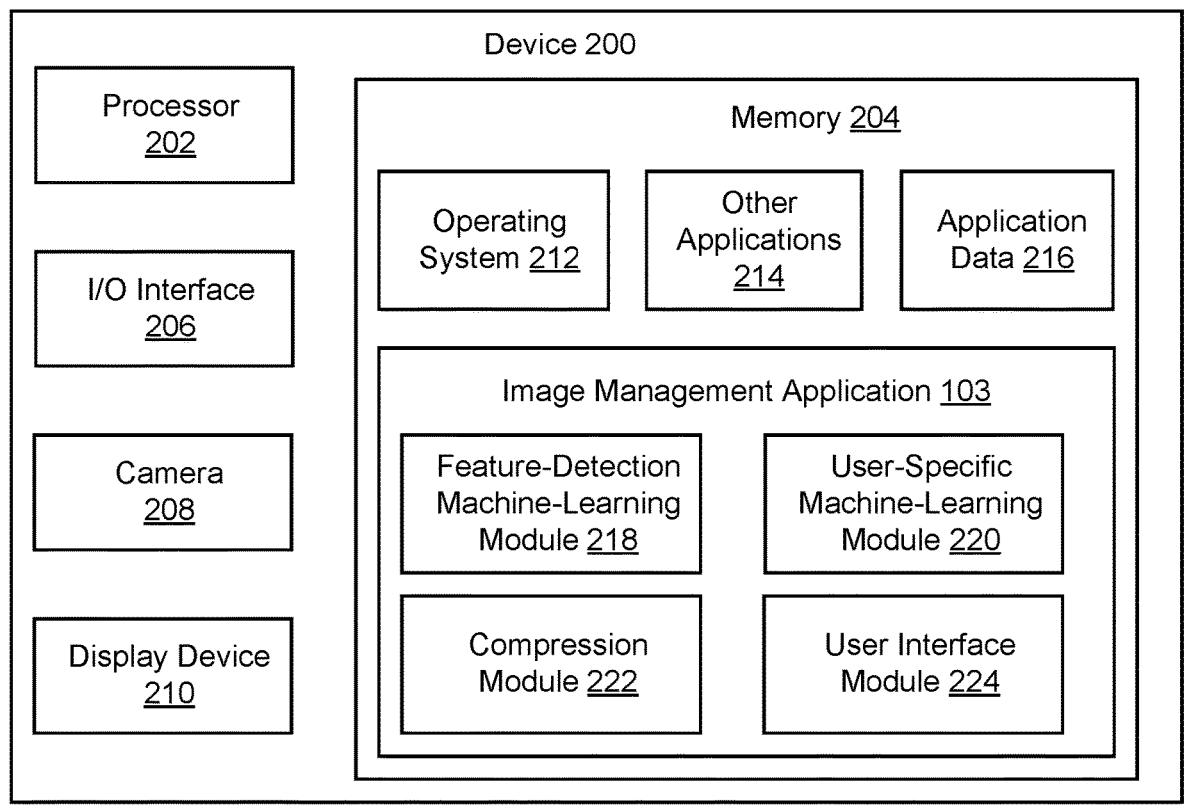
FIG. 2 is a block diagram of an example device which may be used for one or more embodiments described herein.

FIG. 2 is a block diagram of an example device 200 which may be used to implement one or more features described herein. In one example, device 200 may be used to implement a client device 115, e.g., any of client devices 115a, 115n shown in FIG. 1. Alternatively, device 200 can implement a server device, for example, server device 104 shown in FIG. 1. In some embodiments, device 200 may be used to implement a client device, a server device, or both client and server devices. Device 200 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile application (and/or other applications) on the mobile computing device. In another example, computations can be split between the mobile computing device and one or more server devices.

In some embodiments, device 200 includes a processor 202, a memory 204, input/output (I/O) interface 206, camera 208, and display device 210. Processor 202 can be one or more processors and/or processing circuits to execute program code and control basic operations of the device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multi-processor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 202 may include one or more co-processors that implement neural-network processing. In some embodiments, processor 202 may be a processor that processes data to produce probabilistic output, e.g., the output produced by processor 202 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 204 is typically provided in device 200 for access by the processor 202, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 202 and/or integrated therewith. Memory 204 can store software operating on the server device 200 by the processor 202, including an operating system 212, other applications 214, application data 216, and an image management application 103.

Other applications 214 may include applications such as a camera application, an image gallery or image library application, an image management application, a data display engine, a web hosting engine or application, an image display engine or application, a media display application, a communication engine, a notification engine, a social networking engine, a media sharing application, a mapping application, etc. One or more methods disclosed herein can operate in several environments and platforms, e.g., as a stand-alone computer program that can run on any type of computing device, as a web application having web pages, as a mobile application ("app") run on a mobile computing device, etc. In some embodiments, the other applications 214 can each include instructions that enable processor 202 to perform functions described herein, e.g., some or all of the methods of FIGS. 3 and 4A-4B.

The application data 216 may be data generated by the other applications 214 or hardware for the device 200. For example, the application data 216 may include images captured by the camera 208, user actions identified by the other applications 214 (e.g., a social networking application), etc.

I/O interface 206 can provide functions to enable interfacing the device 200 with other systems and devices. Interfaced devices can be included as part of the device 200 or can be separate and communicate with the device 200. For example, network communication devices, storage devices (e.g., memory and/or database 199), and input/output devices can communicate via I/O interface 206. In some embodiments, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 206 can include one or more display devices 210 that can be used to display content, e.g., images, video, and/or a user interface of an output application as described herein. Display device 210 can be connected to device 200 via local connections (e.g., display bus) and/or via networked connections and can be any suitable display device. Display device 210 can include any suitable display device such as a liquid crystal display (LCD), light emitting diode (LED), or plasma display screen, cathode ray tube (CRT), television, monitor, touchscreen, three-dimensional display screen, or other visual display device. For example, display device 210 can be a flat display screen provided on a mobile device, multiple display screens embedded in a glasses form factor or headset device, or a monitor screen for a computer device.

The I/O interface 206 can interface to other input and output devices. Some examples include one or more cameras, such as the camera 208, which can capture images. Some embodiments can provide a microphone for capturing sound (e.g., as a part of captured images, voice commands, etc.), audio speaker devices for outputting sound, or other input and output devices.

Camera 208 may be any type of camera that can capture a video that includes a plurality of frames. Camera as used herein can include any image capture device. In some embodiments, camera 208 may include a plurality of lenses that have different capabilities, e.g., front-facing vs. rear-facing, different zoom levels, image resolutions of captured images, etc. In some embodiments, device 200 may include one or more sensors, such as a depth sensor, an accelerometer, a location sensor (e.g., global positioning system (GPS)), a gyroscope, etc. In some embodiments, the one or more sensors may be operated together with the camera 208 to obtain sensor readings corresponding to different frames of the video captured using the camera 208.

Example Image Management Application 103

Image management application 103 may include a feature-detection machine-learning module 218, a user-specific machine-learning module 220, a compression module 222, and a user interface module 224.

In some embodiments, the feature-detection machine-learning module 218 generates a feature-detection machine-learning model to identify features from images. For example, the features may be vectors in a multidimensional feature space (embedding). Images with similar features may have similar feature vectors, e.g., vector distance between the feature vectors of such images may be lower than the vector distance between dissimilar images. The feature space may be a function of various factors of the image, e.g., the depicted subject matter (objects detected in the image), composition of the image, color information, image orientation, image metadata, specific objects recognized in the image (e.g., with user permission, a known face), etc.

The user-specific machine-learning module 220 may generate a user-specific machine-learning model that is personalized to a user account associated with the user. The user-specific machine-learning module 220 may use the user-specific machine-learning model to determine a compression setting for the image based on the features in the image. This advantageously preserves storage space while keeping images in as high quality as possible based on what the user is interested in. For example, the user-specific machine-learning model may output an indication that the image of a sunset is to be compressed with a high compression ratio. For example, such indication may be determined based on the user-specific machine-learning model analyzing the image, including features detected by the feature-detection machine-learning module 218. If the image is not associated with features that determine that the image is not important to the user, because the image includes a sunset, the compression setting should be the highest level of compression for the image.

Example Feature-Detection Machine-Learning Module 218

The feature-detection machine-learning module 218 generates a feature-detection machine-learning model that determines one or more features of input images. In some embodiments, the feature-detection machine-learning module 218 includes a set of instructions executable by the processor 202 to generate the feature-detection machine-learning model. In some embodiments, the feature-detection machine-learning module 218 is stored in the memory 204 of the device 200 and can be accessible and executable by the processor 202.

In some embodiments, the feature-detection machine-learning module 218 may use training data to generate a trained model, specifically, a feature-detection machine-learning model. For example, training data may include any type of data such as images (e.g., static images, cinemagraph/motion images, image frames from videos, etc.) and optionally, corresponding features (e.g., labels or tags associated with each of the images that identify objects in the images).

For example, training data may include a training set comprising a plurality of digital images and corresponding features. In some embodiments, the training data may include images that have augmentations, such as rotations, light shifts, and color shifts in order to provide invariance in a model when it is provided user photos that may be rotated or have unusual characteristics (e.g., artifacts of the camera used to capture the image). Training data may be obtained from any source, e.g., a data repository specifically marked for training, data for which permission is provided for use as training data for machine-learning, etc. In embodiments where one or more users permit use of their respective user data to train a machine-learning model, training data may include such user data. In embodiments where users permit use of their respective user data, data may include permitted data such as images/videos or image/video metadata (e.g., images, corresponding features that may originate from users providing manual tags or labels, etc.), communications (e.g., messages on a social network; e-mail; chat data such as text messages, voice, video, etc.), documents (e.g., spreadsheets, text documents, presentations, etc.), etc.

In some embodiments, training data may include synthetic data generated for the purpose of training, such as data that is not based on user input or activity in the context that is being trained, e.g., data generated from simulated or computer-generated images/videos, etc. In some embodiments, the feature-detection machine-learning module 218 uses weights that are taken from another application and are unedited/transferred. For example, in these embodiments, the trained model may be generated, e.g., on a different device, and be provided as part of the image management application 103. In various embodiments, the trained model may be provided as a data file that includes a model structure or form (e.g., that defines a number and type of neural network nodes, connectivity between nodes and organization of the nodes into a plurality of layers), and associated weights. The feature-detection machine-learning module 218 may read the data file for the trained model and implement neural networks with node connectivity, layers, and weights based on the model structure or form specified in the trained model.

The feature-detection machine-learning module 218 generates a trained model that is herein referred to as a feature-detection machine-learning model. In some embodiments, the feature-detection machine-learning module 218 is configured to apply the feature-detection machine-learning model to data, such as application data 216 (e.g., input images), to identify one or more features in an input image and to generate a feature vector (embedding) representative of the image. In some embodiments, the feature-detection machine-learning module 218 may include software code to be executed by processor 202. In some embodiments, the feature-detection machine-learning module 218 may specify circuit configuration (e.g., for a programmable processor, for a field programmable gate array (FPGA), etc.) enabling processor 202 to apply the feature-detection machine-learning model. In some embodiments, the feature-detection machine-learning module 218 may include software instructions, hardware instructions, or a combination. In some embodiments, the feature-detection machine-learning module 218 may offer an application programming interface (API) that can be used by operating system 212 and/or other applications 214 to invoke the feature-detection machine-learning module 218, e.g., to apply the feature-detection machine-learning model to application data 216 to determine the one or more features of the input image.

In some embodiments, the feature-detection machine-learning model may include one or more model forms or structures. In some embodiments, the feature-detection machine-learning model could use a support vector machine, however, in some embodiments a convolutional neural network (CNN) is preferable. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 216. Such data can include, for example, one or more pixels per node, e.g., when the feature-detection machine-learning model is used for analysis, e.g., an input image, such as a first image associated with a user account. Subsequent intermediate layers may receive as input, output of nodes of a previous layer per the connectivity specified in the model form or structure. These layers may also be referred to as hidden layers. A final layer (e.g., output layer) produces an output of the machine-learning application. For example, the output may be image features that are associated with the input image. In some embodiments, the model form or structure also specifies a number and/or type of nodes in each layer.

The features output by the feature-detection machine-learning module 218 may include a subject (e.g., sunset vs. a particular person); colors present in an image (a green hill vs. a blue lake); color balance; lighting source, angles, and intensity; a position of objects in the image (e.g., adherence to the rule of thirds); position of objects relative to each other (e.g., depth of field), location of the shot; focus (foreground vs. background); or shadows. While the foregoing features are human-understandable, it will be understood that the features output may be embeddings or other mathematical values that are representative of the image and are not human parseable (e.g., no individual feature value may correspond to a particular feature such as colors present, object position, etc.); however, the trained model is robust to images such that similar features are output for similar images, and images with significant dissimilarities have correspondingly dissimilar features.

In some embodiments, the model form is a CNN with network layers where each network layer extracts image features at different levels of abstraction. A CNN that is used to identify features in an image may be used for image classification. In some embodiments, the CNN may be used to identify features of an image and then transfer learning is applied by replacing a classification layer, or more specifically, a fully-connected feed-forward neural network output layer, with a user-specific machine-learning model as described below. In some embodiments, the CNN is a VGGnet, ResNet, AlexNet, Inception network, or any other state of the art neural network regarded for image processing applications and is trained using a training set of digital images, such as ImageNet. The model architecture may include combinations and orderings of layers made up of multi-dimensional convolutions, average pooling, max pooling, activation functions, normalization, regularization, and other layers and modules used in practice for applied deep neural networks.

In different embodiments, the feature-detection machine-learning model can include one or more models. One or more of the models may include a plurality of nodes, or in the case of a CNN—a filter bank, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processors cores of a multicore processor, using individual processing units of a GPU, or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the feature-detection machine-learning model may include embeddings or weights for individual nodes. For example, the feature-detection machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The feature-detection machine-learning model may then be trained, e.g., using the training set of digital images, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., a set of digital images) and a corresponding expected output for each input (e.g., one or more features for each image). Based on a comparison of the output of the feature-detection machine-learning model with the expected output, values of the weights are automatically adjusted, e.g., in a manner that increases a probability that the feature-detection machine-learning model produces the expected output when provided similar input.

In some embodiments, training may include applying unsupervised learning techniques. In unsupervised learning, only input data (e.g., images with labeled features) may be provided and the feature-detection machine-learning model may be trained to differentiate data, e.g., to cluster features of the images into a plurality of groups, where each group includes images with features that are similar in some manner.

In various embodiments, a trained model includes a set of weights, corresponding to the model structure. In embodiments where a training set of digital images is omitted, the feature-detection machine-learning module 218 may generate a feature-detection machine-learning model that is based on prior training, e.g., by a developer of the feature-detection machine-learning module 218, by a third-party, etc. In some embodiments, the feature-detection machine-learning model may include a set of weights that are fixed, e.g., downloaded from a server that provides the weights.

In some embodiments, the feature-detection machine-learning module 218 may be implemented in an offline manner. In these embodiments, the feature-detection machine-learning model may be generated in a first stage, and provided as part of the feature-detection machine-learning module 218. In some embodiments, small updates of the feature-detection machine-learning model may be implemented in an online manner. In such embodiments, an application that invokes the feature-detection machine-learning module 218 (e.g., operating system 212, one or more of other applications 214, etc.) may utilize feature detection produced by the feature-detection machine-learning module 218, e.g., provide the feature detection to the user-specific machine-learning module 220, and may generate system logs (e.g., if permitted by the user, an action taken by the user based on the feature detection; or if utilized as input for further processing, a result of the further processing). System logs may be produced periodically, e.g., hourly, monthly, quarterly, etc. and may be used, with user permission, to update the feature-detection machine-learning model, e.g., to update embeddings for the feature-detection machine-learning model.

In some embodiments, the feature-detection machine-learning module 218 may be implemented in a manner that can adapt to particular configuration of device 200 on which the feature-detection machine-learning module 218 is executed. For example, the feature-detection machine-learning module 218 may determine a computational graph that utilizes available computational resources, e.g., processor 202. For example, if the feature-detection machine-learning module 218 is implemented as a distributed application on multiple devices, the feature-detection machine-learning module 218 may determine computations to be carried out on individual devices in a manner that optimizes computation. In another example, the feature-detection machine-learning module 218 may determine that processor 202 includes a GPU with a particular number of GPU cores (e.g., 1000) and implement the feature-detection machine-learning module 218 accordingly (e.g., as 1000 individual processes or threads).

In some embodiments, the feature-detection machine-learning module 218 may implement an ensemble of trained models. For example, the feature-detection machine-learning model may include a plurality of trained models that are each applicable to the same input data. In these embodiments, the feature-detection machine-learning module 218 may choose a particular trained model, e.g., based on available computational resources, success rate with prior inferences, etc.

In some embodiments, the feature-detection machine-learning module 218 may execute a plurality of trained models. In these embodiments, the feature-detection machine-learning module 218 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the feature-detection machine-learning module 218 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the feature-detection machine-learning module 218, e.g., by operating system 212 or one or more applications 612.

Example User-Specific Machine-Learning Module 200

The user-specific machine-learning module 220 generates a user-specific machine-learning model that determines a compression setting for the same input image analyzed by the feature-detection machine-learning module 218. In some embodiments, the user-specific machine-learning module 220 includes a set of instructions executable by the processor 202 to generate the user-specific machine-learning model. In some embodiments, the user-specific machine-learning module 220 is stored in the memory 204 of the device 200 and can be accessible and executable by the processor 202.

In some embodiments, the user-specific machine-learning module 220 may use training data to generate a trained model, specifically, a user-specific machine-learning model. Training data may include any type of data such as user-specific features indicative of user action with reference to one or more prior images for the feature-detection machine-learning model. For example, the user-specific features may indicate an extent to which the user is interested in an image. Indicating that an image is a favorite (e.g., marked as a favorite via explicit user input) may be viewed as an important image that should not be compressed. Other examples of user-specific features may include user action, such as any of tagging other users in an image; sharing an image; creating a photo album or other image-based creation; commenting on an image; metadata that is of important to the user, such as geolocalization data indicating that the image was captured in an important location; downloading an image, editing an image, ordering a print of an image; editing an image; data from explicitly asking a user whether they like an image; etc. In some embodiments, the user action may include actions for another user's images, such as using natural language processing to determine sentiment of a comment on another user's image as a signal of interest in the image, indicating approval for (e.g., liking) another user's image, saving another user's image, downloading another user's image, etc. These user actions are signals of a value of the image and can be used as an input to the model.

Training data may be obtained from any source, e.g., a data repository specifically marked for training, data for which permission is provided for use as training data for machine-learning, etc. In embodiments where one or more users permit use of their respective user data to train a machine-learning model, training data may include such user data. In embodiments where users permit use of their respective user data, data may include permitted data such as images/videos or image/video metadata (e.g., images, corresponding features for the images, user-specific features associated with a user, descriptions of how the user-specific features are indicative of user action with reference to one or more prior images, etc.), communications (e.g., messages on a social network; e-mail; chat data such as text messages, voice, video, etc.), documents (e.g., spreadsheets, text documents, presentations, etc.), etc. In some embodiments, the prior images that were used by the feature-detection machine-learning module 218 to generate a feature-detection machine-learning model on how to identify one or more features are used by the user-specific machine-learning module 220 to generate a user-specific machine-learning model to determine a compression setting based on user-specific features indicative of user action and respective image features of the prior images.

For example, the trained model may be generated, e.g., on a different device, and be provided as part of the image management application 103. In various embodiments, the trained model may be provided as a data file that includes a model structure or form (e.g., that defines a number and type of neural network nodes, connectivity between nodes and organization of the nodes into a plurality of layers), and associated weights. The user-specific machine-learning module 220 may read the data file for the trained model and implement neural networks with node connectivity, layers, and weights based on the model structure or form specified in the trained model.

The user-specific machine-learning module 220 generates a trained model that is herein referred to as a user-specific machine-learning model. In some embodiments, the user-specific machine-learning module 220 is configured to apply the user-specific machine-learning model to data, such as data for the compression module 222, to identify a compression setting for the input image. In some embodiments, the user-specific machine-learning module 220 may include software code to be executed by processor 202. In some embodiments, the user-specific machine-learning module 220 may specify circuit configuration (e.g., for a programmable processor, for a field programmable gate array (FPGA), etc.) enabling processor 202 to apply the user-specific machine-learning model. In some embodiments, the user-specific machine-learning module 220 may include software instructions, hardware instructions, or a combination.

In some embodiments, the user-specific machine-learning model may include one or more model forms or structures. For example, model forms or structures can include any type of neural-network, such as a linear network, a deep neural network, such as a multilayer feed forward fully connected neural network, a CNN, or a sequence-to-sequence neural network as discussed in greater detail above.

The model form or structure may specify connectivity between various nodes and organization of nodes into layers. For example, nodes of a first layer (e.g., input layer) may receive data as input data or application data 216. Such data can include, for example, one or more user-specific features per node, e.g., when the feature-detection machine-learning model is used for analysis, e.g., of user-specific features indicative of user action associated with an image. Subsequent intermediate layers may receive as input, output of nodes of a previous layer per the connectivity specified in the model form or structure. These layers may also be referred to as hidden layers. A final layer (e.g., output layer)

produces an output of the machine-learning application. For example, the output may be a compression setting for the image based on the user-specific features. More specifically, the output may be a determination of an extent to which the user is interested in the image, which corresponds to a rating for the image, which the user-specific machine-learning module 220 maps to a compression setting. In some embodiments, the model form or structure also specifies a number and/or type of nodes in each layer.

The user-specific machine-learning model receives inputs from the feature-detection machine-learning module 218 in order to identify features from the input image that feed into the user-specific machine-learning model. The inputs allow the feature-detection machine-learning model to identify features from the input image and determine whether the input image is interesting to the user. The user-specific machine-learning model is trained on user-specific features indicative of user action to identify which features in the image that the user is interested in based on signals, such as sharing photos, viewing them, etc. In some embodiments, the signal is a label (e.g., a user ranking, a star on a photo, at least one share, x amount of views, etc.) to explicitly estimate relative importance to a user. In some embodiments, these may be placed in a stack rank to create clusters. Within a cluster, the user-specific machine-learning model uses a feature detection algorithm to generate a similarity metric and then uses the similarity metric to estimate relative importance to a user.

In some embodiments where there are no user-specific features available, the user-specific machine-learning model may generate a baseline compression setting. For example, the baseline compression setting may be generated from user input from other users where the input is a ranking of images based on blurriness or other types of indicators of less interesting images In this example, the user-specific machine-learning model may apply a higher compression ratio on those types of images and images of a specific type (e.g., receipts).

The output of the user-specific machine-learning model may be a rating that identifies a level of interest for the user, such as using a scale from 1-5, 1-10, etc. or a regression output (analog value), for example 7.83790. The user-specific machine-learning model may map the rating to a compression setting, such as a compression ratio. Below is an example of how ratings can be mapped to compression ratios. In this example, for a rating of 1, a compressed image would occupy 0.2 of an original resolution of an original image.

| Rating | Compression (original_size:new_size) |
| --- | --- |
| 1 | 1:0.2 |
| 2 | 1:0.3 |
| 3 | 1:0.5 |
| 4 | 1:0.8 |
| 5 | 1:1 |

Although the above example describes compression settings that include ratings that are mapped to compression ratios, other examples of compression settings are possible. For example, the user-specific machine-learning model may determine compression techniques, image format (e.g., use of JPEG, WebP, HEIF, etc.), parameters selected for optimization (e.g., dynamic range, image resolution, colors, whether the compression is progressive or not), etc. In another example, the compression setting may be a determination to keep one or more features in an image in high resolution and to compress the rest of the image, such as by determining one or more regions of interest in the images. In another example, in addition to the user-specific machine-learning model determining a rating for different features in an image, the user-specific machine-learning model may also determine that quality tradeoff is considered for certain types of images. For example, dynamic range may be crucial for sunset images, resolution may be more important for close-ups, etc.

In yet another example, the user-specific machine-learning model may also indicate how to apply a rating when different features are included in the same image. For example, if an image would normally have a five rating if it includes a sunset, but a two rating if it includes food, the user-specific machine-learning model may apply the rating indicative of being most interesting, i.e. the five rating. In another embodiment, the user-specific machine-learning model may determine that a particular user's reactions to images suggest that the ratings for multiple features should be averaged, certain features should be associated with a higher weight, etc.

In some embodiments, the user-specific machine-learning model may determine that the rating for an input image meets an importance threshold and in response to the rating meeting the importance threshold, the user-specific machine-learning model provides a suggestion that the user share the input image. In another embodiment, in response to the rating meeting the importance threshold, the user-specific machine-learning model prioritizes backup of the input image over other images associated with the user account that do not meet the importance threshold. For example, in instances where a client device 115 is located in an area with limited internet access, the user-specific machine-learning model may instruct the client device 115 to transmit the images with a highest rating (or sorted in descending order based on ratings) to be transferred to the server system 101 for storage. In another embodiment, in response to the rating meeting the importance threshold, the user-specific machine-learning model instructs the user interface module 220 to provide a user interface that includes instructions for capture of a subsequent image, if a scene depicted in the subsequent image has at least one of the one or more features of the input image. For example, where the user is interested in taking photos of plants, the user interface could inform the user that water droplets on a photo can blur the petals. In another example, if a feature of interest is observed in the image, the camera can auto lock focus onto the feature of interest (and allow the user to change the focus with a tap).

In different embodiments, the user-specific machine-learning model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a nonlinear function.

In various embodiments, such computation may include operations such as matrix multiplication. In some embodiments, computations by the plurality of nodes may be performed in parallel, e.g., using multiple processors cores of a multicore processor, using individual processing units of a GPU, or special-purpose neural circuitry. In some embodiments, nodes may include memory, e.g., may be able to store and use one or more earlier inputs in processing a subsequent input. For example, nodes with memory may include LSTM nodes. LSTM nodes may use the memory to maintain state that permits the node to act like a FSM.

In some embodiments, the user-specific machine-learning model may include embeddings or weights for individual nodes. For example, the user-specific machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The user-specific machine-learning model may then be trained, e.g., using the training set of user-specific, to produce a result.

Training may include applying supervised learning techniques. In supervised learning, the training data can include a plurality of inputs (e.g., ratings given to different types of images) and a corresponding expected output for each input (e.g., a compression setting). Based on a comparison of the output of the feature-detection machine-learning model (e.g., a predicted rating) with the expected output (e.g., the rating provided by a user), values of the weights are automatically adjusted, e.g., in a manner that increases a probability that the user-specific machine-learning model produces the expected output when provided similar input. One example of ratings provided by a user for different types of categories of images associated with the user is included below. In this example a lowest rating is associated with least important and a highest rating is associated with most important.

| Category | Rating Given |
| --- | --- |
| Receipts | 1 |
| Screenshots | 1 |
| Food | 2 |
| Cars | 3 |
| Cats | 4 |
| Sunsets | 5 |
| Landscapes | 5 |

In various embodiments, a trained model includes a set of weights, or embeddings, corresponding to the model structure. In embodiments where a training set of digital images is omitted, the user-specific machine-learning module 220 may generate a user-specific machine-learning model that is based on prior training, e.g., by a developer of the user-specific machine-learning module 220, by a third-party, etc. In some embodiments, the user-specific machine-learning model may include a set of weights that are fixed, e.g., downloaded from a server that provides the weights.

The user-specific machine-learning module 220 may be implemented in an offline manner and/or as an ensemble of trained models and with different formats. Because this was described above with reference to the feature-detection machine-learning module 218, it is understood that the same description could apply to the user-specific machine-learning module 220. As a result, the description will not be repeated again.

Example Compression Module 222

The compression module 222 compresses the input image based on the compression setting determined by the user-specific machine learning module 220. In some embodiments, the compression module 222 includes a set of instructions executable by the processor 202 to compress the input image. In some embodiments, the compression module 222 is stored in the memory 204 of the device 200 and can be accessible and executable by the processor 202.

The compression module 222 may receive the input image from the feature-detection machine-learning module 218 and the compression setting from the user-specific machine-learning module 220. The compression module 222 applies the compression setting to the input image. The compression module 222 may replace the original input image with the compressed input image in order to reduce a file size to make more efficient use of memory 204 and/or a storage device on which the image is to be stored. In some embodiments, the compression module 222 may transmit the compressed input image to another location for storage. For example, where the image management application 103b is part of the client device 115a, the compression module 222 may transmit the compressed input image to the server system 101 for storage.

Example User Interface Module 224

The user interface module 224 generates a user interface that receives input from a user. In some embodiments, the user interface module 224 includes a set of instructions executable by the processor 202 to compress the input image. In some embodiments, the user interface module 224 is stored in the memory 204 of the device 200 and can be accessible and executable by the processor 202.

In some embodiments, the user interface module 224 generates a user interface for changing different settings associated with the image management application 103. In some embodiments, the user interface module 224 generates a user interface and receives user input in order to determine a baseline compression setting. For example, the user interface module 224 may generate a user interface that is viewable by a user associated with a user account.

The user interface may include two or more versions of a sample image where each of the images is compressed with a different compression setting. The user interface may include a prompt asking the user to identify a particular version of the sample image as a baseline compression setting for the user account. For example, the baselines compression setting may represent the lowest compression setting that the user accepts for the images associated with the user account. The user interface module 224 may request user input regarding a baseline compression setting multiple times to confirm the accuracy of the baseline compression setting. For example, the user interface module 224 may provide images with different features, display the user interface periodically (once a week, once a month, each time there is a software update for the image management application 103), etc.

In some embodiments, the user interface module 224 may generate warnings in response to the user's selection. For example, if the user selects a high-resolution compression setting or no compression setting at all, the user interface module 224 may warn the user that storage space will run out in a certain number of days or after a certain number of additional images are captured. This estimation may be done based on the mean of photo size the user has uploaded in the last x days.

The user interface module 224 may transmit the results of the user's selections to the user-specific machine-learning module 220 to use for determining a compression setting for an input image. The machine-learning module 220 may then map a rating to the compression setting based on the baseline compression setting.

Any of the software in memory 204 can alternatively be stored on any other suitable storage location or computer-readable medium. In addition, memory 204 (and/or other connected storage device(s)) can store one or more messages, one or more taxonomies, electronic encyclopedia, dictionaries, thesauruses, knowledge bases, message data, grammars, and/or other instructions and data used in the features described herein. Memory 204 and any other type of storage (magnetic disk, optical disk, magnetic tape, or other tangible media) can be considered "storage" or "storage devices."

For ease of illustration, FIG. 2 shows one block for each of processor 202, memory 204, I/O interface 206, camera 208, display device 210, and software blocks 103, 218, 220, 220, 222, and 224. These blocks may represent one or more processors or processing circuitries, operating systems, memories, I/O interfaces, applications, and/or software modules. In other embodiments, device 200 may not have all of the components shown and/or may have other elements including other types of elements instead of, or in addition to, those shown herein. While some components are described as performing blocks and operations as described in some embodiments herein, any suitable component or combination of components of environment 100, device 200, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

Example Methods

FIG. 3 is a flow diagram illustrating an example method 300 to use a feature-detection machine-learning model 304 to identify one or more features 306 in an input image 302 and to use a user-specific machine-learning model 308 to determine a compression setting 310 from the one or more features of the image, according to some embodiments.

The feature-detection machine-learning model 304 may include a deep neural network, such as a convolutional neural network (CNN) with a set of layers that build up from pixels into more abstract objects. In some implementations, earlier layers of the CNN detect edges and as the depth of the layers increases, human-defined meaningfulness of the features increase. For example, middle stage layers may detect components of an object, and later stage layers may detect objects (or faces) themselves.

An input image 302 is provided as input to the feature-detection machine-learning model 304. The input image 302 is from a user associated with a user account. The input image 302 may be received by an input layer of a set of layers. The input layer may be connected to a second layer of the set of layers. In some embodiments, one or more additional layers each receive as input an output of a previous layer and provide input to a next layer. The feature-detection machine-learning model 304 generates one or more features 306 based on the input image 302. A last layer of the set of layers may be an output layer. Continuing with this example, the output layer may output the one or more features 306.

In some embodiments, the output may include corresponding probabilities that each of the features has been accurately identified in the images. Output of the feature-detection machine-learning model 304 may be a vector of numbers, a probability value, or a set of probability values (e.g., each corresponding to a particular stack of video frames). Output of the feature-detection machine-learning model 304 is provided as input to the user-specific machine-learning model 308.

The user-specific machine-learning model 308 may also include a deep neural network, such as a CNN. In some embodiments, the user-specific machine-learning model 308 may be generated using transfer learning by replacing a classification layer of the feature-detection machine-learning model 304 with components that are trained with user-specific features associated with the user, where the user-specific features are indicative of user action with reference to prior images. In some embodiments, the prior images are also used to train the feature-detection machine-learning model 304.

The user-specific machine-learning model 308 may receive the one or more features 306 via an input layer. The input layer may be connected to a second layer of the plurality of layers. In some embodiments, one or more additional layers each receiving as input an output of a previous layer and providing input to a next layer, may be included in the user-specific machine-learning model 308. A last layer of the user-specific machine-learning model 308 may be an output layer. In some implementations, model 308 may have a single input layer that directly outputs compression setting 310.

The user-specific machine-learning model 308 may generate as output a compression setting 310 (prediction 310) and optionally, a probability associated with the compression setting 310. In some embodiments, the compression setting 310 may include one or more ratings for the one or more features in the input image 302. The probability may include a probability value, a set of probability values (e.g., each corresponding to a rating for a particular feature in the input image 302), or a vector representation generated by an output layer of the user-specific machine-learning model 308.

In some embodiments, the method 300 may be implemented on one or more of client devices 115a, 115n, e.g., as part of image management application 103b. In some embodiments, the method 300 may be implemented on server device 104, e.g., as part of image management application 103a. In some embodiments, the method 300 may be implemented on server device 104 and on one or more of client devices 115a, 115n.

In some embodiments, the method 300 may be implemented as software executable on a general-purpose processor, e.g., a central processing unit (CPU) of a device. In some embodiments, the method 300 may be implemented as software executable on a special-purpose processor, e.g., a graphics processing unit (GPU), a field-programmable gate array (FPGA), a machine-learning processor, etc. In some embodiments, the method 300 may be implemented as dedicated hardware, e.g., as an application specific integrated circuit (ASIC).

Figure 4:
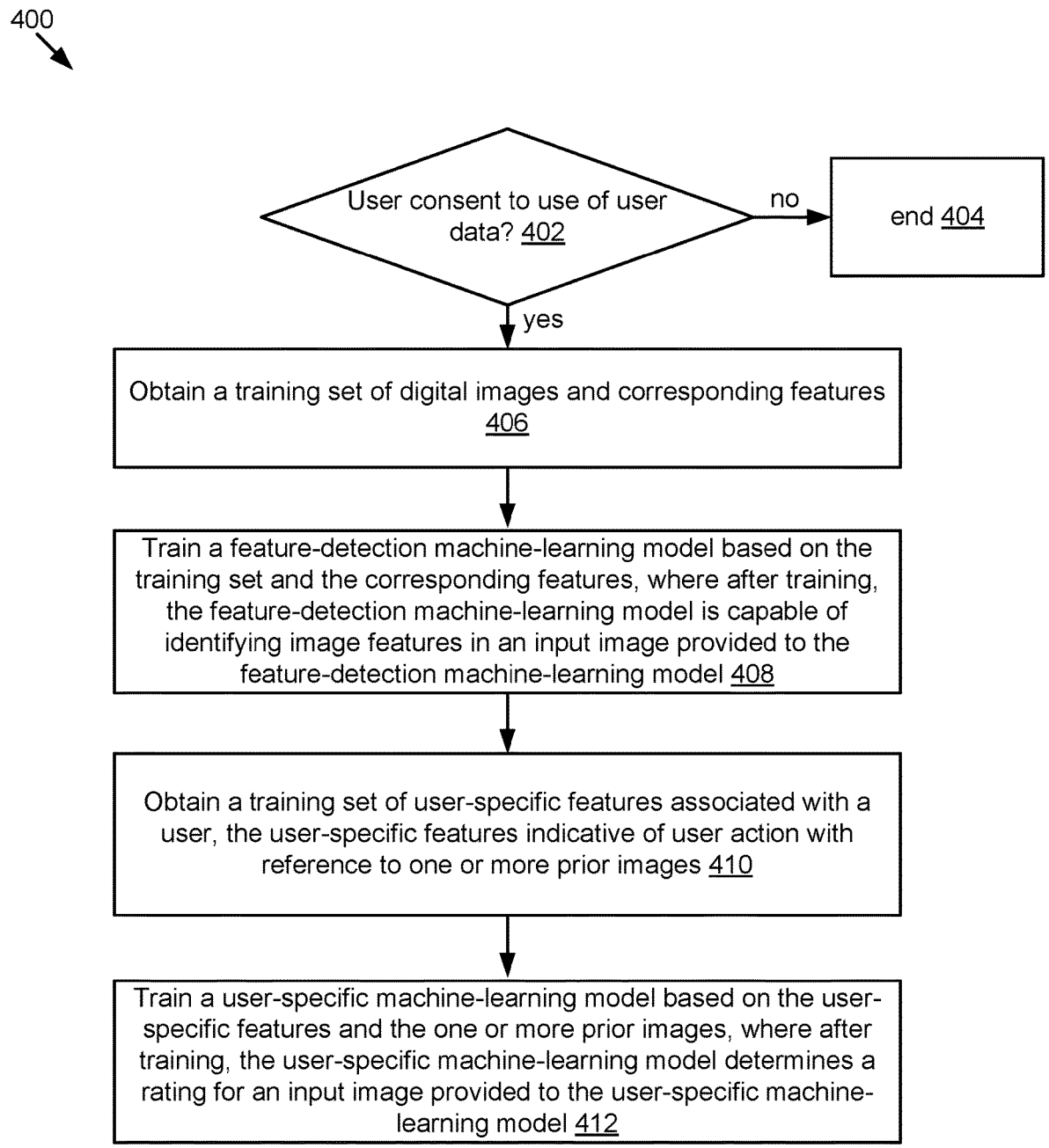
FIG. 4 is a flow diagram illustrating an example method for creating training models according to some embodiments.

FIG. 4 is a flow diagram illustrating an example method 400 for creating training models according to some embodiments.

The method 400 may begin at block 402. In block 402, it is determined whether user consent to use of user data was obtained. For example, the user interface module 224 may generate a user interface that requests permission from the user to use user data in the generation of a feature-detection machine-learning model and/or the user-specific machine-learning model. If user consent was not obtained, at block 404 a baseline model is used instead of a feature-detection machine-learning model and/or the user-specific machine-learning model.

If user consent was obtained, the method 400 may proceed to block 406 where a training set of digital images and corresponding features is obtained. Block 406 may be followed by block 408. At block 408, a feature-detection machine-learning model is trained based on the training set and the corresponding features, where after training, the feature-detection machine-learning model is capable of identifying image features in an input image provided to the feature-detection machine-learning model. Block 408 may be followed by block 410.

At block 410, a training set of user-specific features associated with a user are obtained, where the user-specific features are indicative of user action with reference to one or more prior images. In some embodiments, the prior images are the same as the set of digital images. Block 410 may be followed by block 412. At block 412, a user-specific machine-learning model is trained based on the user-specific features and the one or more prior images, where after training, the user-specific machine-learning model determines a rating for an input image provided to the user-specific machine-learning model.

Figure 5:
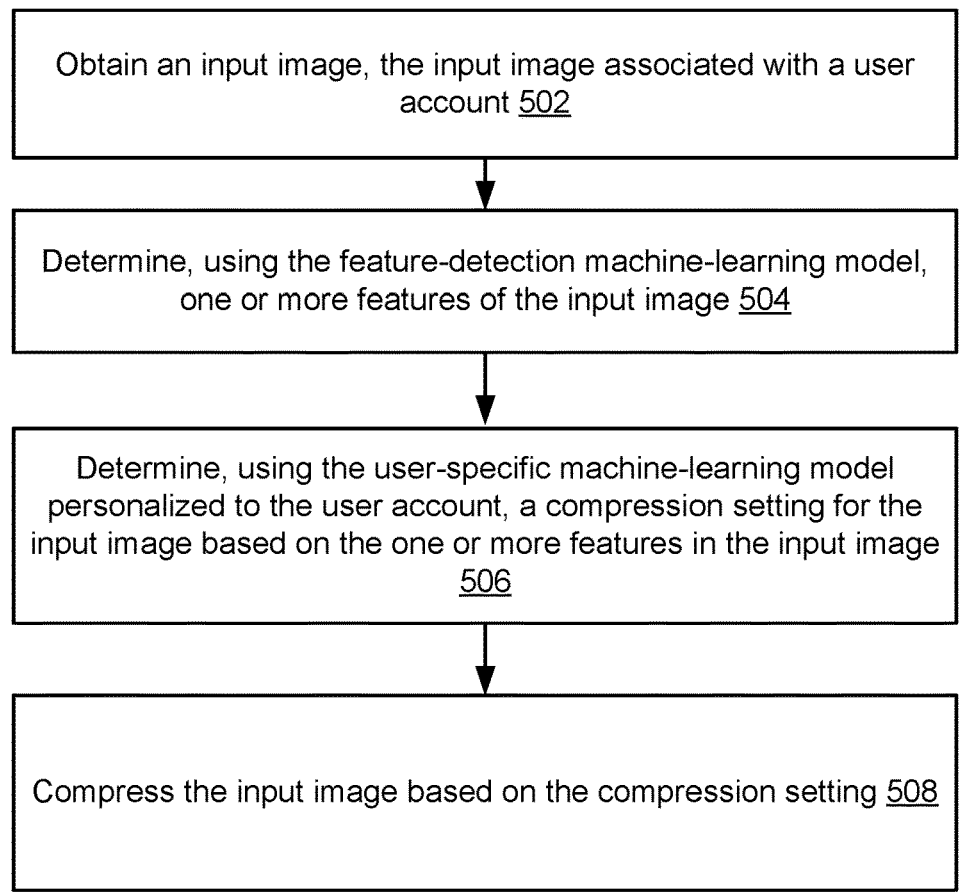
FIG. 5 is a flow diagram illustrating an example method for applying the models to an input image according to some embodiments.

FIG. 5 is a flow diagram illustrating an example method 500 for applying the models to an input image according to some embodiments.

At block 502, an input image is obtained, the input image associated with a user account. Block 502 may be followed by block 504. At block 504, one or more features of the input image are determined using the feature-detection machine-learning model. Block 504 may be followed by block 506. At block 506, a compression setting for the input image is determined using the user-specific machine-learning model personalized to the user account based on the one or more features in the input image. Block 506 may be followed by block 508. At block 508, the input image is compressed based on the compression setting.

Prior to the training, each of the nodes may be assigned an initial weight and connections between nodes of different layers of the neural network may be initialized. Training may comprise adjusting the weight of one or more nodes and/or connections between one or pairs of nodes.

In some embodiments, a subset of the training set may be excluded in an initial training phase. This subset may be provided after the initial training phase and the accuracy of prediction (indication of whether to analyze the video) may be determined. If the accuracy is below a threshold, further training may be performed with additional digital images or user-specific features, respectively, from the training sets to adjust model parameters until the models correctly predict their outputs.

The further training (second phase) may be repeated any number of times, e.g., until the model achieves a satisfactory level of accuracy. In some embodiments, the trained model may be further modified, e.g., compressed (to use fewer nodes or layers), transformed (e.g., to be usable on different types of hardware), etc. In some embodiments, different versions of the model may be provided, e.g., a client-version of the model may be optimized for size and to have reduced computational complexity, whereas a server-version of the model may be optimized for accuracy.

While methods 400, 450 have been described with reference to various blocks in FIGS. 4A and 4B, it may be understood that techniques described in this disclosure may be performed without performing some of the blocks of FIGS. 4A and 4B. In some embodiments, one or more of the blocks illustrated in FIGS. 4A and 4B may be combined.

Further, while training has been described with reference to a training set, the feature-detection machine-learning model and the user-specific machine-learning model may be trained during operation. For example, if a user requests that an image be compressed using a particular compression setting, the feature-detection machine-learning model and the user-specific machine-learning model may be updated to include the user information. In some embodiments, the user may provide annotations manually, e.g., providing a list of features and corresponding ratings for the features. With user permission, some embodiments may utilize such annotations to train the feature-detection machine-learning model and the user-specific machine-learning model.

Although the description has been described with respect to particular embodiments thereof, these particular embodiments are merely illustrative, and not restrictive. Concepts illustrated in the examples may be applied to other examples and embodiments.

In situations in which certain embodiments discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. Users have the ability to delete these models permanently.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a client device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular embodiments. Different programming techniques may be employed, e.g., procedural or object-oriented. The routines may execute on a single processing device or multiple processors. Although the steps, operations, or computations may be presented in a specific order, the order may be changed in different particular embodiments. In some embodiments, multiple steps or operations shown as sequential in this specification may be performed at the same time.

What is claimed is:

1. A computer-implemented method comprising:
providing a first user interface to a user associated with a user account with two or more versions of a sample image, each compressed with a different compression setting;
obtaining user input from the user that identifies a particular version of the sample image from the two or more versions; and
selecting a baseline compression setting associated with the particular version of the sample image as a baseline for the user account;
obtaining an input image, the input image associated with the user account;
determining, using a feature-detection machine-learning model, one or more features of the input image including one or more regions of interest;
determining, using a user-specific machine-learning model personalized to the user account, a second compression setting for the input image based on the baseline compression setting and the one or more features in the input image by keeping the one or more regions of interest in the input image in high resolution and compressing a remaining portion of the input image; and
compressing the input image based on the second compression setting.

2. The computer-implemented method of claim 1, wherein the feature-detection machine-learning model is generated by:
obtaining a training set of digital images and corresponding features; and
training the feature-detection machine-learning model based on the training set and the corresponding features, wherein after training, the feature-detection machine-learning model is capable of identifying image features in the input image provided to the feature-detection machine-learning model.

3. The computer-implemented method of claim 2, wherein the user-specific machine-learning model is generated by:
obtaining a training set of user-specific features associated with a user, the user-specific features indicative of user action with reference to one or more prior images; and
training the user-specific machine-learning model based on the user-specific features and the one or more prior images, wherein after training, the user-specific machine-learning model determines a rating for the input image provided to the user-specific machine-learning model.

4. The computer-implemented method of claim 3, wherein the second compression setting includes a mapping of the rating to a compression ratio for the remaining portion of the input image that compares an original size of the input image to a new size of the input image.

5. The computer-implemented method of claim 3, wherein determining one or more features of the input image further includes identifying a type of the input image and the rating is based on the type of the input image.

6. The computer-implemented method of claim 3, wherein respective image features of the one or more prior images are obtained by applying the feature-detection machine-learning model to the one or more prior images.

7. The computer-implemented method of claim 1, further comprising:
responsive to obtaining the user input, providing a warning that storage space of the user account is predicted to run out after a particular number of days or after a predicted number of additional images are captured.

8. The computer-implemented method of claim 1, wherein determining the second compression setting comprises:
determining, by the user-specific machine-learning model a rating for the input image; and
mapping the rating to the second compression setting, wherein the mapping is based on the baseline compression setting.

9. The computer-implemented method of claim 8, further comprising:
determining that the rating for the input image meets an importance threshold; and
in response to determination that the rating meets the importance threshold, performing one or more actions selected from a group of:
providing a suggestion that the user share the input image,
prioritizing backup of the input image over backup of other images associated with the user account that do not meet the importance threshold,
providing a second user interface that includes instructions for capture of a subsequent image, if a scene depicted in the subsequent image has at least one of the one or more features of the input image, and combinations thereof.

10. A computing device comprising:
a processor; and
a memory, with instructions stored thereon that, when executed by the processor cause the processor to perform operations comprising:
providing a first user interface to a user associated with a user account with two or more versions of a sample image, each compressed with a different compression setting;
obtaining user input from the user that identifies a particular version of the sample image from the two or more versions; and
selecting a baseline compression setting associated with the particular version of the sample image as a baseline for the user account;
obtaining an input image, the input image associated with the user account;

determining, using a feature-detection machine-learning model, one or more features of the input image including one or more regions of interest;

determining, using a user-specific machine-learning model personalized to the user account, a second compression setting for the input image based on the baseline compression setting and the one or more features in the input image by keeping the one or more regions of interest in the input image in high resolution and compressing a remaining portion of the input image; and compressing the input image based on the second compression setting.

11. The computing device of claim 10, wherein the feature-detection machine-learning model is generated by:

obtaining a training set of digital images and corresponding features; and training the feature-detection machine-learning model based on the training set and the corresponding features, wherein after training, the feature-detection machine-learning model is capable of identifying image features in the input image provided to the feature-detection machine-learning model.

12. The computing device of claim 11, wherein the user-specific machine-learning model is generated by:

obtaining a training set of user-specific features associated with the user, the user-specific features indicative of user action with reference to one or more prior images; and training the user-specific machine-learning model based on the user-specific features and the one or more prior images, wherein after training, the user-specific machine-learning model determines a rating for the input image provided to the user-specific machine-learning model.

13. The computing device of claim 10, wherein the memory has further instructions stored thereon that, when executed by the processor cause the processor to perform further operations comprising:

responsive to obtaining the user input, providing a warning that storage space of the user account is predicted to run out after a particular number of days or after a predicted number of additional images are captured.

14. The computing device of claim 10, wherein determining the second compression setting comprises:

determining, by the user-specific machine-learning model a rating for the input image; and mapping the rating to the second compression setting, wherein the mapping is based on the baseline compression setting.

15. A non-transitory computer-readable medium with instructions stored thereon that, when executed by one or more computers, cause the one or more computers to perform operations, the operations comprising:

providing a first user interface to a user associated with a user account with two or more versions of a sample image, each compressed with a different compression setting;

obtaining user input from the user that identifies a particular version of the sample image from the two or more versions; and selecting a baseline compression setting associated with the particular version of the sample image as a baseline for the user account;

obtaining an input image, the input image associated with the user account;

determining, using a feature-detection machine-learning model, one or more features of the input image including one or more regions of interest;

determining, using a user-specific machine-learning model personalized to the user account, a second compression setting for the input image based on the baseline compression setting and the one or more features in the input image by keeping the one or more regions of interest in the input image in high resolution and compressing a remaining portion of the input image; and compressing the input image based on the second compression setting.

16. The computer-readable medium of claim 15, wherein the feature-detection machine-learning model is generated by:

obtaining a training set of digital images and corresponding features; and training the feature-detection machine-learning model based on the training set and the corresponding features, wherein after training, the feature-detection machine-learning model is capable of identifying image features in the input image provided to the feature-detection machine-learning model.

17. The computer-readable medium of claim 16, wherein the user-specific machine-learning model is generated by:

obtaining a training set of user-specific features associated with the user, the user-specific features indicative of user action with reference to one or more prior images; and training the user-specific machine-learning model based on the user-specific features and the one or more prior images, wherein after training, the user-specific machine-learning model determines a rating for the input image provided to the user-specific machine-learning model.

18. The computer-readable medium of claim 17, wherein the training set further includes respective image features of the one or more prior images.

19. The computer-readable medium of claim 15, wherein the operations further comprise:

responsive to obtaining the user input, providing a warning that storage space of the user account is predicted to run out after a particular number of days or after a predicted number of additional images are captured.

20. The computer-readable medium of claim 17, wherein determining the second compression setting comprises:

determining, by the user-specific machine-learning model a rating for the input image; and mapping the rating to the second compression setting, wherein the mapping is based on the baseline compression setting.

* * * * *